No. 637,848. Patented Nov. 28, 1899.
C. S. BONE.
SICKLE FOR HARVESTERS.
(Application filed May 29, 1899.)
(No Model.)
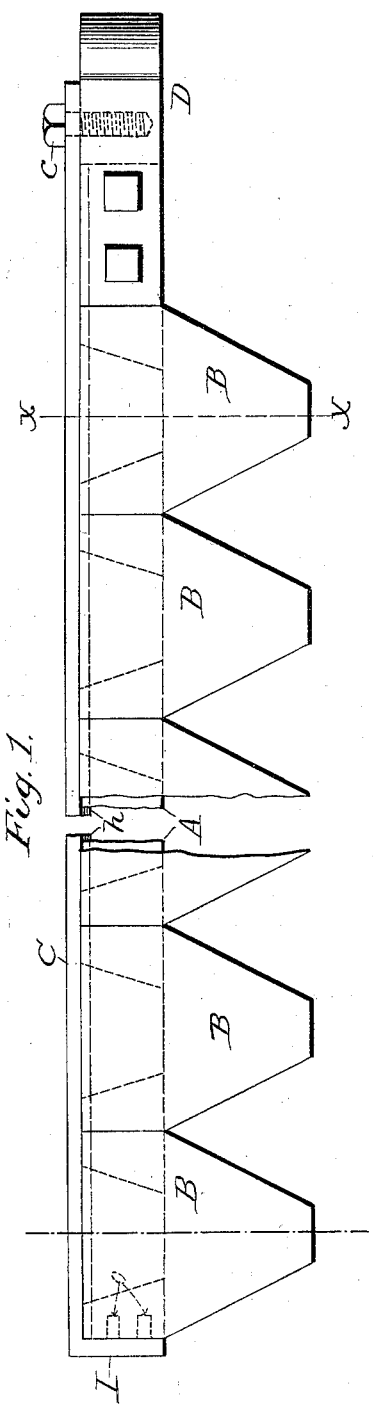
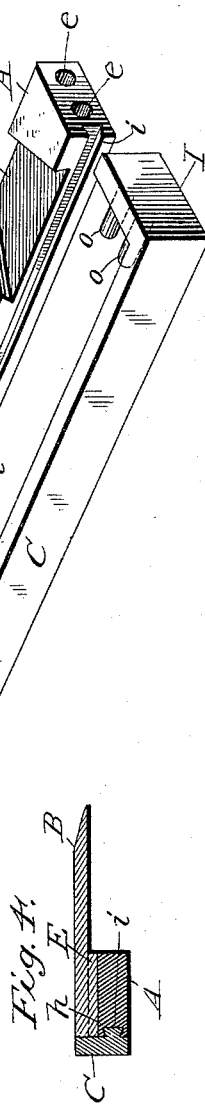
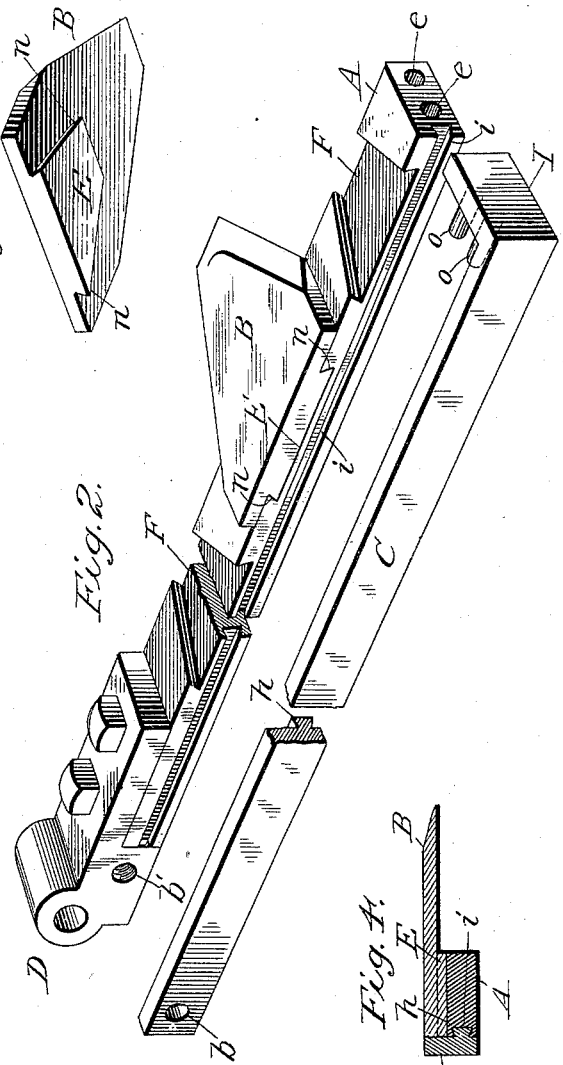
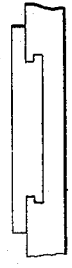
Witnesses
Inventor:
Charles S. Bone,
by Dodge and Sons,
Attorneys.
THE NORRIS PETERS CO., PHOTO-LITHO., WASHINGTON, D. C.

UNITED STATES PATENT OFFICE.

CHARLES S. BONE, OF LINEVILLE, IOWA, ASSIGNOR OF ONE-HALF TO DAVID F. BONE, OF ALBANY, MISSOURI.

SICKLE FOR HARVESTERS.

SPECIFICATION forming part of Letters Patent No. 637,848, dated November 28, 1899.

Application filed May 29, 1899. Serial No. 718,712. (No model.)

*To all whom it may concern:*

Be it known that I, CHARLES S. BONE, a citizen of the United States, residing at Lineville, in the county of Wayne and State of Iowa, have invented certain new and useful Improvements in Sickles for Harvesters, of which the following is a specification.

My invention relates to sickles for harvesters; and the invention consists in a novel construction of the sickle whereby the teeth can be separately and quickly detached from the cutter-bar, as hereinafter more fully set forth.

Figure 1 is a top plan view of a sickle made on my plan. Fig. 2 is a perspective view with some of the teeth removed and with the locking-bar shown detached. Fig. 3 is a perspective view of a tooth detached and showing the locking projection on its under side. Fig. 4 is a transverse section on the line *x x* of Fig. 1, and Fig. 5 a detail view showing a modified form of the locking projections on the teeth.

As is well known, the teeth of sickles used in harvesters require to be ground frequently, and as the sickles are usually made with the teeth riveted fast to the cutter-bar the whole sickle has to be removed, and it is a difficult thing to handle and requires a special apparatus for grinding the teeth accurately. It frequently happens that one or two teeth are dulled or blunted by coming into contact with some hard substance, and in such cases it is desirable to be able to remove, sharpen, and replace those particular teeth separately, and in all cases the teeth can be held and ground far more conveniently when capable of being detached from the bar and handled separately.

Various plans have been devised for rendering the teeth detachable, but for various reasons they have not come into use.

The object of my invention is to so construct and unite the parts constituting the sickle that the teeth can (any or all of them) be easily and quickly detached, and yet when replaced be held rigidly and securely in place.

To accomplish these results, I construct each tooth B, as shown in Fig. 3, with a projection E on its under side. This projection is equal in length to the width of the bar A to which the teeth are to be attached and is of dovetailed form, it being wider at its rear than at its front end as shown in Fig. 3 and also in dotted lines in Fig. 1. The edges or sides *n* of this dovetailed projection are beveled or undercut, as shown in Figs. 2 and 3. Having thus constructed the teeth, I make in the upper face of the cutter-bar A a series of dovetailed recesses F of a shape and size to correspond with the projections E of the teeth, as shown in Fig. 2, the side walls of these recesses being beveled or undercut to correspond exactly with the beveled sides of the projections on the teeth, so that when the teeth are placed on the bar and shoved forward the projections E will be wedged fast in the sockets F, their interlocking side walls holding the teeth down tight on the bar and preventing them from rising. By this construction or method of uniting the teeth and the bar it will be observed that I secure a wedging action in two directions—one to wedge the tooth fast against lateral movement and the other to hold it down tight upon the bar and prevent vertical movement. To lock the teeth securely in place after they have been thus inserted, I provide a locking-bar C. (Shown detached in Fig. 2 and in place in Fig. 1.) On its inner face this bar is provided with a rib *h*, (shown in Figs. 2 and 4,) it being of dovetail form in cross-section and of a size to fit accurately in a correspondingly-shaped groove *i* formed in the rear edge of the bar A, the groove and rib extending the full length of the bar. At its outer end this bar is bent at a right angle to form an arm I corresponding in length with the width of the bar A, and it is provided with one or more studs or pins *o*, adapted to enter corresponding holes *e* in the end of the bar. At its opposite end this bar C is provided with a hole *b* to correspond with a hole *b'* in the knuckle-joint connection D for the reception of a small screw-bolt *c* to hold it in place, as shown in Fig. 1. After the teeth have been put in place on the bar A the rib *h* of the locking-bar C is inserted in the groove *i* of the bar A and shoved or driven to its place, as shown in Fig. 1, the locking-bar bearing snugly against the rear end of the teeth, and thus locking them securely in place. As the bar is shoved home the studs or pins *o* will enter the holes *e* and help to hold it against displacement, and when fully in place the bolt $c$ is inserted, which prevents the locking-bar from working loose. For convenience in getting the bar in and out it may be desirable to slightly curve the rear ends of the teeth laterally.

As the parts will all be made of steel and the edges or sides of the projections and grooves or sockets will be accurately machined, it will be seen that the parts can be made to fit together so accurately as to prevent any movement of the teeth independently of the bar A, and thus they can be held in place as rigidly as though riveted to the bar, and as the rear face of the lacking-bar C will have a bearing against a support the backward pressure on the sickle produced by the action of cutting will also tend to hold it tight against the rear end of the teeth and prevent them and the locking-bar from becoming loose.

To remove a tooth, it is only necessary to first take out the bolt $c$, then force or slide the locking-bar C out far enough to release the tooth that it is desired to remove, and then slide the tooth back so as to detach its projection E from its socket. If desired to remove all the teeth, the bar C will of course be taken entirely out.

The advantages of being able to remove the teeth so that they can be held or handled separately and apart from the bar are too obvious to require stating.

It is obvious that other means for holding the teeth against backward movement may be used instead of the locking-bar—as, for example, a screw inserted through the tooth and bar—and hence I do not confine myself to the use of the locking-bar for that purpose, but I prefer to use the bar, as it is simpler and has no small pieces to be mislaid or lost. So, too, it is obvious that instead of the beveled undercut on the sides of the projections and the sockets this undercut may be made in the form of a groove in the side walls of one part and a corresponding lip or tongue on the side walls of the other part, as shown in Fig. 5; but I prefer the beveled or inclined undercuts, because they act as wedges to press and hold the teeth more firmly down on the bar and prevent any tendency to their working loose or chattering.

Having thus fully described my invention, what I claim is—

In combination with the bar A provided with the undercut dovetailed recesses or sockets F, decreasing in width toward the front face of the bar; a groove $i$ formed in the rear edge of the bar; the teeth B each provided with a dovetailed projection E upon its under face, adapted to fit in the recesses or sockets F, and a locking-bar C provided with a dovetailed rib $h$ adapted to fit in the groove $i$, with means for fastening the locking-bar in place when inserted, substantially as shown and described.

In witness whereof I hereunto set my hand in the presence of two witnesses.

CHARLES S. BONE.

Witnesses:
HORACE A. DODGE,
C. C. BURDINE.